C. H. BARNES.
AUTOMATIC FIREARM.
APPLICATION FILED MAY 24, 1909.
1,089,621.
Patented Mar. 10, 1914.
6 SHEETS—SHEET 3.
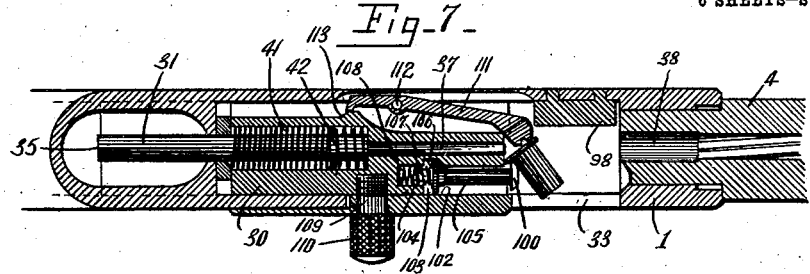
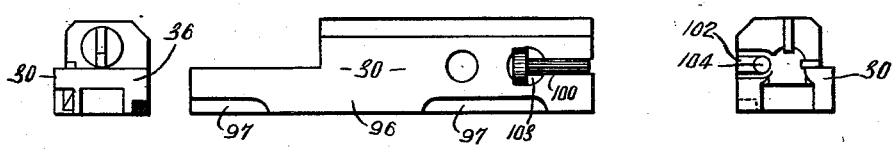
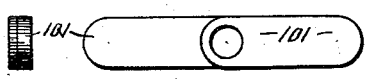
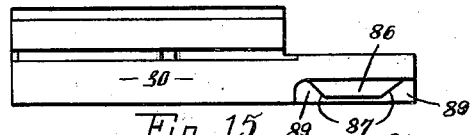
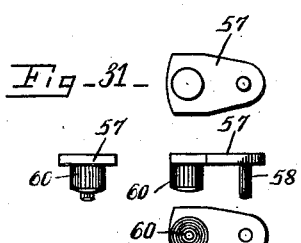
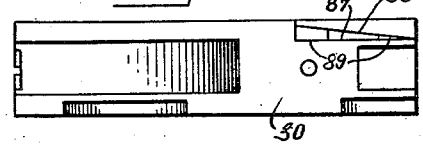
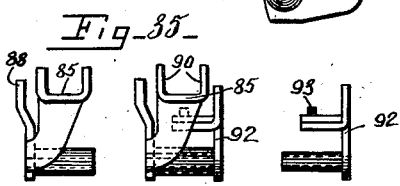
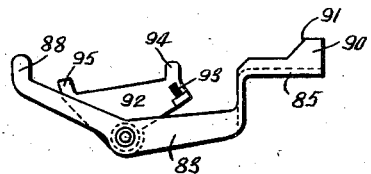
WITNESSES:
Chas. H. Young.
P. Davis.
INVENTOR
Charles H. Barnes
BY
Parsons, Hall & Bodell
ATTORNEYS

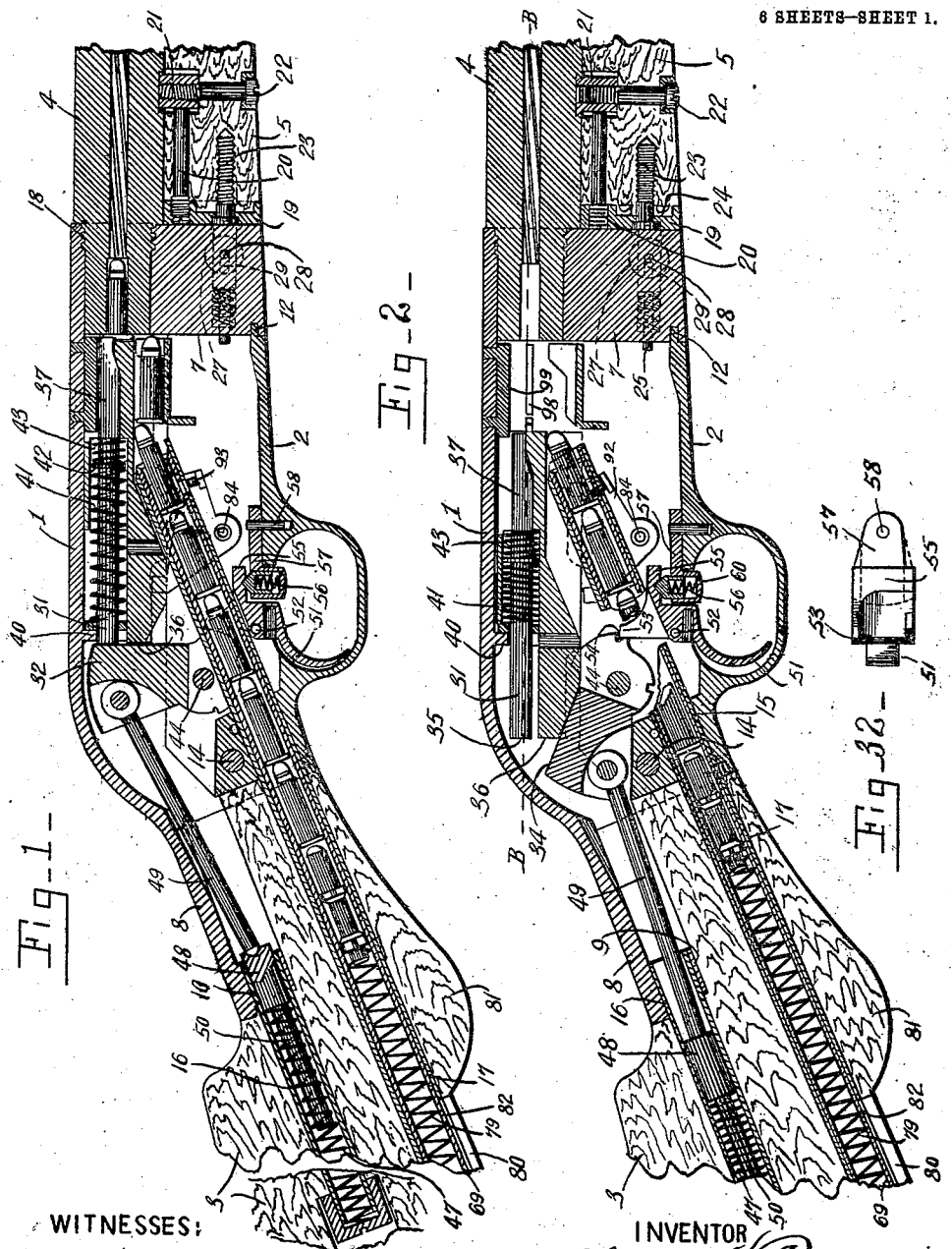

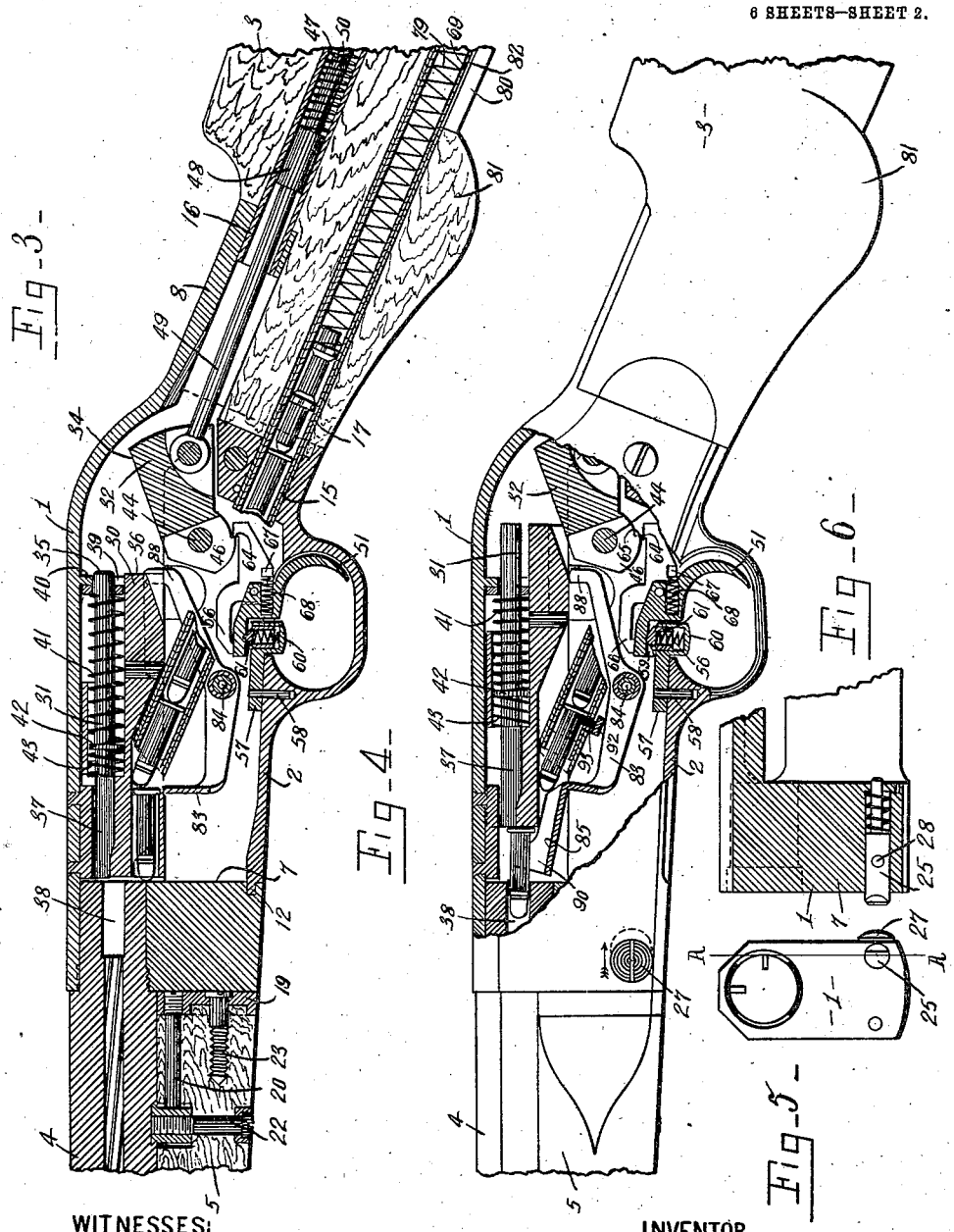

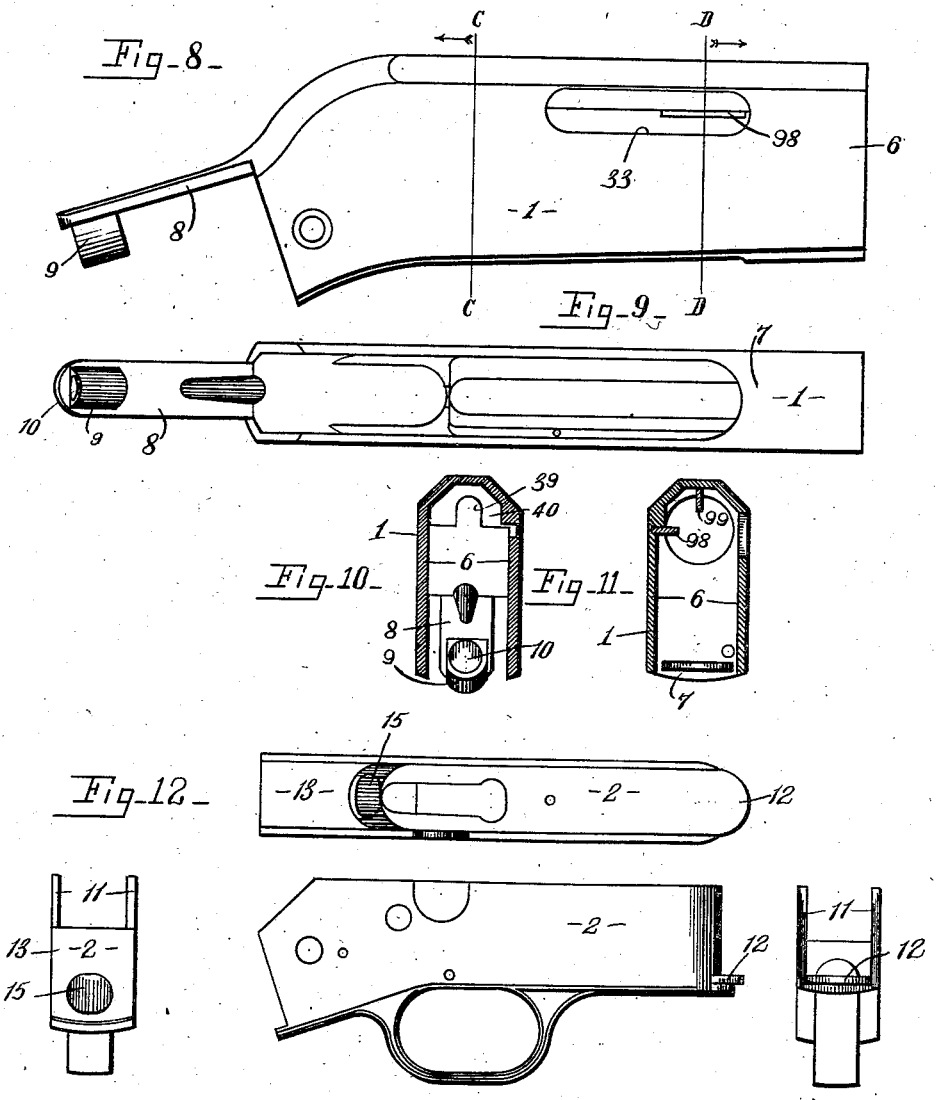

C. H. BARNES.
AUTOMATIC FIREARM.
APPLICATION FILED MAY 24, 1909.
1,089,621.
Patented Mar. 10, 1914.
6 SHEETS—SHEET 5.
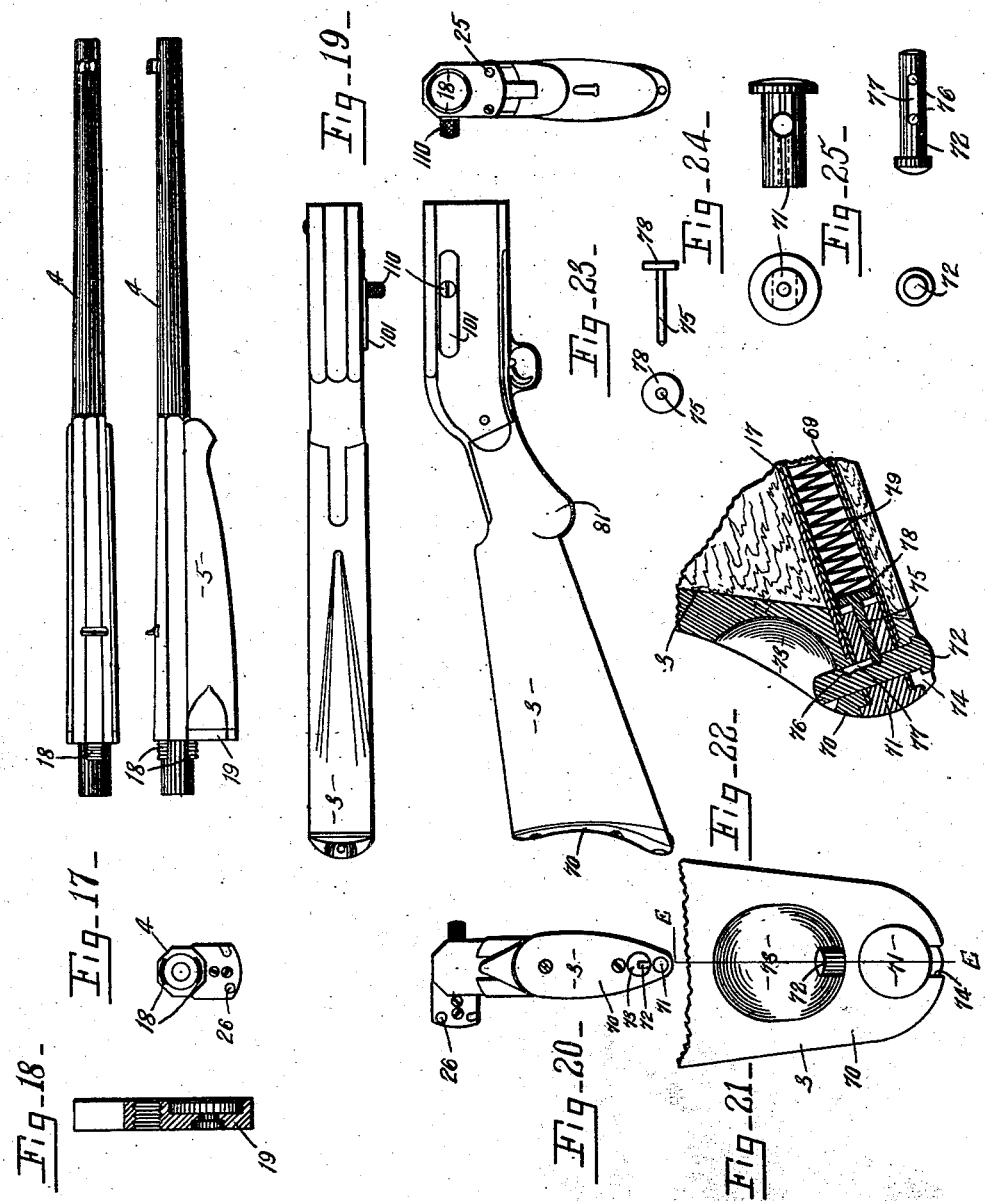
WITNESSES:
Chas H Young
S. Davis
INVENTOR
Charles H Barnes
BY Parsons, Hall & Bodell
ATTORNEYS

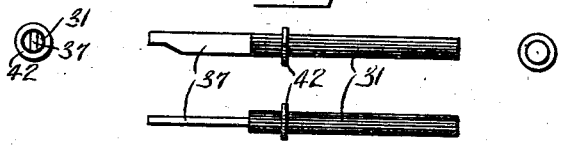
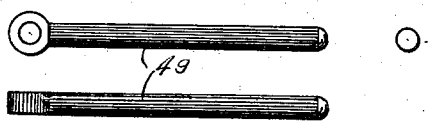
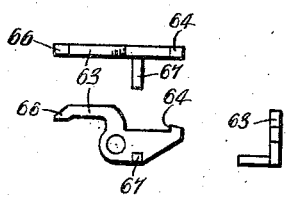
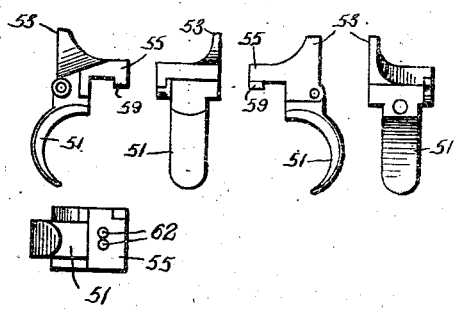
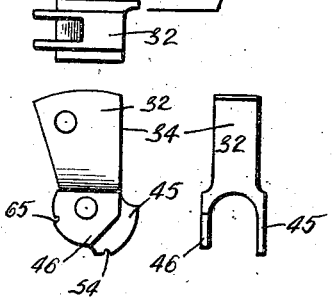

UNITED STATES PATENT OFFICE.

CHARLES H. BARNES, OF ILION, NEW YORK.

AUTOMATIC FIREARM.

1,089,621.   Specification of Letters Patent.   Patented Mar. 10, 1914.

Application filed May 24, 1909. Serial No. 497,829.

*To all whom it may concern:*

Be it known that I, CHARLES H. BARNES, of Ilion, in the county of Herkimer and State of New York, have invented a certain new and useful Automatic Firearm, of which the following is a specification.

My invention has for its object the production of a particularly simple and efficient automatic firearm; and it consists in the combinations and constructions hereinafter set forth and claimed.

In describing this invention reference is had to the accompanying drawing in which like characters designate corresponding parts in all the views.

Figure 1 is a longitudinal section showing the left side of the firearm, and illustrating the position of parts of the firing mechanism when the hammer is down. Fig. 2 is a view similar to Fig. 1 illustrating the action of the parts when the breech bolt is thrown back. Fig. 3 is a longitudinal section showing the right side of the firearm and action of parts when the hammer is cocked. Fig. 4 is a left side elevation of the firearm, partly broken away, and partly in section, illustrating the automatic action of parts just after the breech bolt has started forward. Fig. 5 is an end elevation of the receiver. Fig. 6 is a section on line A—A, Fig. 5. Fig. 7 is a horizontal section on line B—B, Fig. 2. Figs. 8 and 9 are, respectively, a side elevation and an inverted plan of the receiver. Figs. 10 and 11 are sections taken, respectively, on line C—C and D—D, Fig. 8. Fig. 12 is a detail of the trigger plate including plan, side elevation and opposite end views thereof. Fig. 13 is a detail of the breech bolt, comprising a right side elevation and end views. Figs. 14 and 15 are, respectively, a left side elevation and a bottom view of the breech bolt. Fig. 16 illustrates in side and end elevations, the cover for the shell ejection slot. Fig. 17 comprises a plan, and side and end elevations of the barrel and fore stock. Fig. 18 is a vertical section through the fore stock cap. Fig. 19 includes a plan and side view of the stock and receiver and a front elevation thereof. Fig. 20 is a rear elevation of the gun, the barrel being swung out of its normal position preparatory to removing the same. Fig. 21 is a fragmentary view, illustrating in rear elevation, the lower end of the stock. Fig. 22 is a section on line E—E, Fig. 21. Figs. 23, 24 and 25 are details of parts seen in Fig. 22. Fig. 26 shows the firing pin in detail. Fig. 27 illustrates plan, and side and front elevation of the hammer. Fig. 28 shows in detail the link connected to the hammer. Fig. 29 shows in detail the trigger in side elevation, in front and rear end views and in inverted plan. Fig. 30 shows the safety sear in detail. Fig. 31 shows the safety lock in detail. Fig. 32 (Sheet 1), is a plan of the trigger and the safety lock assembled. Fig. 33 shows in detail the plunger associated with the safety lock. Fig. 34 is an elevation of the cartridge carrier and stop; and Fig. 35 is a front end elevation of the carrier and stop assembled and detached.

1 and 2 are, respectively, the receiver and the trigger plate constituting the frame of the firearm; 3 is the stock; 4 the barrel; and 5 the fore stock.

The receiver 1 may be of any desirable form, size and construction, and as here illustrated is formed of one piece of metal and is provided with side plates 6, a block 7 at its front end and with a rearwardly-extending tang 8 at its rear end, the tang being provided with a depending lug 9 having a lengthwise passage 10 therethrough.

The trigger plate 2, Fig. 12, is provided with upright sides 11 telescoping with the side plates 6 of the receiver; and is connected at its front end to the block 7 of the receiver, by a tenon 12 which fits into a mortise in said block 7; and the trigger plate 2 is provided in its rear end with a block 13 integral therewith and arranged between the side plates 6 of the receiver and secured thereto by a fastening member, as a screw 14, extending transversely through the side plates 6 of the receiver and said block 13 of the trigger plate. The block 13 is also formed with an upwardly inclined passage 15 parallel to the passage 10 of the lug 9, the passage 15 receiving the magazine tube as hereinafter explained.

The stock 3 is formed with a lengthwise passage alined with the passage 10 in the lug 9 of the receiver, and is secured to the receiver by a coupling arranged in the alined passages of the receiver and the stock 3 and consisting of a tube 16, Figs. 1, 2 and 3. The stock 3 is also additionally secured in position by a tube 17 arranged in a passage extending lengthwise of the stock 3 and alined with the passage 15 formed in the block 13 of the trigger plate.

The barrel 4 is supported by, and detachable from, the receiver, and is here shown as connected to the receiver by an interrupted screw 18, Figs. 17 and 19, of such length that said barrel may be detached from the receiver by a quarter turn.

The fore stock 5 is supported by the barrel, is adjustable forwardly and rearwardly relatively to the barrel 4 and receiver 1, and is provided with a cap 19 at its rear end for engaging the front face of the block 7 of the receiver. As illustrated the fore-stock is adjustable forwardly and rearwardly by a screw 20 threading into the cap 19 and extending forwardly into the fore stock, and shouldering against the rear face of a barrel lug 21, which projects into a slot formed in the fore stock, the slot being of sufficient length to permit the adjustment of the fore stock. The fore stock is secured to the barrel by a vertical screw 22 extending through the fore stock and threading into the barrel lug, the passage in the fore stock being large enough to permit the adjustment of the fore stock by the screw 20. The cap 19 is secured in position by a screw 23 which threads into the fore stock and is positioned by a tenon 24 which enters a socket formed in the front side of the cap, Fig. 18.

Obviously by loosening the holding screw 22 and turning the adjusting screw 20 the fore stock will be moved rearwardly to compensate for wear and make a tight fit with the receiver.

The barrel is normally held from turning movement by a locking bolt 25 movable in a guide (Figs. 5 and 6) in the block 7 of the receiver and projecting beyond the front end of the receiver, in order to enter a socket 26, Figs. 17 and 19, in the fore stock cap 19. The bolt is provided with an operating piece 27 located on the left hand outer face of the receiver and connected to the bolt by a screw 28 extending through a slot 29.

30 is a breech bolt movable in the receiver and, preferably, slidable along the upper edges of the side plates 11 of the trigger plate 2; 31 is a firing pin carried by the breech bolt; and 32 is the hammer, the breech bolt 30 and firing pin 31 being arranged in the path of the hammer 32, in order to be struck thereby, so that the rearward sliding of the breech bolt 30, effected by the gas pressure, will be momentarily retarded after the firing in order that the bullet will have traveled the major part of the barrel before the rearward movement of the breech bolt commences. Consequently the greater part of the gases is discharged through the front end of the barrel and not through the shell ejection slot 33 formed in the receiver. The hammer 32 is here shown as formed with a flat working face 34 which strikes the end face 35 of the firing pin and a rearwardly facing surface 36 of the breech bolt.

The firing pin 31 is movable in a passage formed in the breech bolt and is provided with a blade 37 at its front end which punctures the head of the cartridge in the firing chamber 38 of the barrel. The firing pin 31 extends through a passage 39 formed in the lug 40, Fig. 10, depending from the top of the receiver, this passage being in the form of a notch or slot opening through the lower end of the lug 40, in order that the breech bolt 30 may be removed when the trigger plate 2 is detached. The breech bolt spring 41 encircles the firing pin 31 and is interposed between said lug 40 and a shoulder or collar 42 on the firing pin 31, said spring serving to return the breech bolt to its normal position after it has been thrown back by the gas pressure. The lug 40, as seen in Fig. 2, also serves to limit the rearward movement of the breech bolt. The firing pin 31 is preferably held flush with the front end surface of the breech bolt at all times, except when being struck by the hammer, by a spring 43 encircling the firing pin 31 and acting on the opposite side of the collar 42 on the firing pin.

The hammer 32 is preferably pivoted at 44 to the upright sides of the trigger plate and its lower end is bifurcated, Fig. 27, and the branches 45, 46 thereof engage said opposite sides of the trigger plate and form a passage for the magazine.

47 is the main spring arranged in the tube 16 coupling the receiver 1 and stock 3. 48 is a plunger movable rectilinearly in said tube in front of the spring 47, the plunger 48 being connected to the hammer 32 by a link 49 pivoted at its front end to the hammer and having its rear end rounded and fitted in a socket in the front end of the plunger, the socket and rounded end forming a pivotal connection. The plunger 48 is also formed with a guide stem 50 for the main spring 47. By increasing the strength of the spring 47 or the weight of the parts 48 and 49, the action or firing mechanism can be adapted to firearms designed to shoot cartridges of larger caliber.

51 is a trigger pivoted at 52 to the sides of the trigger plate 2 and having means associated therewith for coöperating respectively with the bifurcations 45, 46 of the hammer 32 for holding the hammer cocked, the means coöperating with one of said bifurcations of the hammer operating alternately with the means coöperating with the other bifurcations in order to prevent doubling, that is, repeated firing on one pull of the trigger. As here shown the trigger 51 is formed with an upright arm 53 which engages a tooth or shoulder 54 provided on the left hand bifurcation 45 of the hammer 32, the point of engagement of said arm 53 and the hammer 32 being in a vertical line above the pivot 52 of the trigger, and the trigger 51 is also formed with a forwardly-extending arm 55 which overhangs the trigger plate 2, and with which the trigger spring 56 coöperates, said spring 56 pressing upwardly on the arm 55. As here shown, the trigger spring 56 is carried by a safety device 57 pivoted by a vertical pivot 58 to the trigger plate in front of the trigger and extended rearwardly under the overhanging arm 55, said arm 55 and safety 57 being formed with surfaces normally spaced apart and with surfaces for engaging each other in order to prevent movement of the trigger, and the trigger spring 56 is carried by the part of the safety device overhung by the forwardly-extending arm 55 of the trigger. The forwardly-extending arm 55 of the trigger is here shown as provided with a depending shoulder 59, Fig. 29, located on the right hand side of the trigger, Figs. 4 and 29, so that, when the safety device 57 is swung to the right, the upper face thereof will engage the end of the depending shoulder 59 and lock the trigger from pivotal movement. The end surface of the shoulder 59 and the surface of the safety device which engages the end of the shoulder constitute surfaces for engaging each other in order to prevent movement of the trigger and the under surface of the overhanging arm 55 and the upper surface of the device 57 constitutes the surfaces normally spaced apart. The safety device 57 is provided at its free end, that is the end overhung by the forwardly-extending arm 55 of the trigger, with a socket member 60 in which moves a plunger 61 having a pointed end for engaging the overhanging arm 55 of the trigger 51, the plunger 61 being pressed upward by the trigger spring 56 located in the socket member 60. The point of the plunger 61 enters indentations 62, Fig. 29, provided on the under face of the overhanging arm 55 of the trigger, and serves to hold the safety device 57 in either of its adjusted positions. The socket member 60 extends through the trigger plate in front of the trigger and serves as a finger engaging piece.

The means associated with the trigger for preventing doubling is here shown as what for convenience I call a safety sear 63, Fig. 30, mounted on the trigger pivot 52 and located contiguous to the right hand bifurcation 46 of the hammer 32, the safety sear 63 having a pawl tooth 64, which coöperates with a ratchet tooth 65 on the right hand bifurcation of the hammer, and also a forwardly-extending arm 66 which engages the upper face of the trigger in order that any pivotal movement of the trigger will be transferred to the safety sear 63, so that the safety sear and trigger act normally as one body. However, the safety sear 63 is capable of a yielding movement relatively to the trigger 51 in order that when the trigger 51 is held in its rear position by the finger of the shooter, the pawl tooth 64 of the sear may ratchet over the tooth 65 on the hammer and thus hold the hammer from movement. As here shown, the safety sear 63 is formed with a laterally-extending arm or shoulder 67 extending to the left in rear of the trigger, and a spring 68 presses against the end of the arm 67, the spring 68 being located in a horizontal socket formed in the trigger 51. It is obvious that if the trigger 51 is not released by the shooter after firing a shot, the safety sear 63 is in position to hold the hammer 32 cocked after it has been carried back by the breech bolt 30, and that when the shooter does release the trigger, the safety sear 63 is disengaged from the hammer while the upright arm 53 of the trigger moves into engagement with the left hand bifurcation 45 and holds the hammer cocked.

69 is the magazine tube movable into the tube 17 and removable therefrom by an endwise sliding movement. The magazine tube 69 extends through the butt 70 of the stock 3 and terminates at its front end beneath the breech bolt 30, said tube 69 extending between the bifurcations 45, 46 of the hammer 32 and the upright arm 53 of the trigger 51 and the safety sear 63. The tube 69 is provided at its outer end with a plug 71, and is locked in the stock by means of a sliding bolt 72 extending transversely through the plug 71 and the tube 69 and through the contiguous portion of the stock into a recess 73 formed in the butt 70 and located above the lower end of the magazine tube 69. The portion of the stock butt 70 along the lower side of the stock is formed with a slot 74 opening through the lower corner of the stock and the side of the passage for the tube 17 in order that when the bolt 72 is moved downwardly so that its upper end is below the surface of the inner magazine tube 69, the tube 69 may be withdrawn carrying the bolt 72 therewith, the projecting portion of the bolt 72 passing through the slot 74. The sliding movement of the bolt 72 may be started by inserting the thumb or finger in the recess 73 and depressing the end of the bolt 72, so that its head is moved outwardly into position where it may be conveniently taken hold of. The sliding bolt 72 is held in either of its two positions by a spring-pressed key 75 the end of which is movable into sockets 76 spaced apart in the direction of the length of the bolt 72 and located at the opposite ends of a lengthwise groove 77 formed in the bolt 72, the key 75 having a head 78 located in the magazine tube 69 against which the magazine spring 79 presses. The stock 3 is formed with a slot 80 located in rear of the grip 81 and alined with a slot 82 in the tube 17, Fig. 3, and in order to load the magazine 69 it is first withdrawn until its front end is in rear of the slots 80, 82 so that the cartridges can be inserted in the tube 17 through the slots 80, 82. When a given number of cartridges have been inserted, the magazine tube is returned to its normal position tensioning the spring 79.

83 is a cartridge carrier mounted on a pivot 84, supported by the side plates of the trigger plate 2, said carrier 83 being pivoted intermediate of its ends and the major part being located contiguous to the right side of the trigger plate, and the carrier being provided at its front end with an inwardly-extending cartridge support 85 normally arranged in front of the end of the magazine tube 68 and at its rear end with means for engaging cam faces, Figs. 14 and 15, on the right side of the sliding bolt, in order that the cartridge carrier may be operated by the breech bolt 30. In order that the cartridge carrier 83 may be operated only during the forward movement of the sliding breech bolt 30, one of the cams as 86 faces laterally and is arranged at an angle to the other cam face 87 which faces downwardly and the arm 88 engaging the cams is capable of yielding or springing laterally during the rearward movement of the breech bolt 30 and while said arm engages the laterally facing cam 86, in order that no pivotal movement may be transferred to the carrier 83, and the breech bolt is formed with passages 89 at the ends of the cams 86, 87, for guiding the arm 88 from one cam to the other when the breech bolt is at the end of its forward and rearward movement. At the beginning of the forward movement of the breech bolt the arm engages the under cam 87 on the breech bolt, in order that the rear end of the carrier may be depressed and the front end swung up, Fig. 4, carrying a cartridge into the path of the breech bolt by means of which the cartridge is carried into the firing chamber 38 of the barrel.

The cartridge support 85 at the front end of the carrier 83 is provided with sides 90 which are formed with cam faces 91 movable into the path of the front end of the breech bolt 30, in order to engage the front end of the bolt during the forward movement thereof, and effect the returning of the carrier to its normal position, Fig. 3.

On the pivot 84 of the carrier 83 and contiguous to the left upright side of the trigger plate 2 is mounted a stop 92 for preventing movement of the cartridges in the magazine by the magazine spring 79 when the breech is open, Fig. 4, so that the cartridges can not become jammed in the breech. This stop 92, as seen in Figs. 1, 2, 3, 34 and 35, comprises a lever pivoted between its ends and having a shoulder or pin 93 which extends through the tubes 17 and 69 into the path of the rims of the cartridges, said lever being mounted on the cartridge carrier pivot 84 and having arms 94, 95 in front and in rear of the pivot for engaging a cam 96 located on the left hand side of the breech bolt 30, the cam 96 being formed by recessing the breech bolt at 97. The cam 96 rocks the stop 92 during the movement of the breech bolt 30. The relative arrangement of the cartridge carrier 83 and stop 92 is such that a passage for the tubes 17, 69 is formed.

98 and 99 are cartridge guides located in the receiver 1 in rear of the firing chamber 38 at the left side and top of the receiver, respectively, the guide 98 at the side being located directly opposite the shell ejection slot 33 in the receiver in order to guide cartridges into the firing chamber when the firearm is being loaded by hand through the slot 33, and the guide 99 at the top guiding the cartridge in the firing chamber from the carrier 83.

100 is an extractor carried by the breech bolt 30 and held in position by the cover 101 for the shell exit slot 33. As seen in Figs. 7 and 13, the breech bolt 30 is formed with a groove 102 in its right side opening through the front end of the bolt and with an enlarged recess 103 at the rear end of said groove 102 and also with a socket 104 extending rearwardly from the recess 103; and the extractor is formed with a shank 105 in the groove 102, with a collar or head 106 in the recess 103, and with a short stem 107 extending into the socket 104, the stem 107 guiding the extractor spring 108. Obviously the extractor 100 can be removed or placed in its position by a lateral movement and is held in its position by said spring 108 and the cover 101 of the receiver. Said cover 101 is connected to the breech bolt by a bolt 109 having a knurled head 110 which serves as a handle for operating the breech bolt by hand.

111 is the ejector here shown as a lever pivoted at 112 to the left side of the receiver at one side of the breech bolt, one arm thereof engaging the cartridge during the rear movement of the breech bolt and the other end engaging the cam 113 on the breech bolt.

My gun is particularly advantageous in that it can be cheaply manufactured and is compact in its organization and consists of the minimum number of parts, and it will be noted that the entire action or firing mechanism can be removed by detaching the trigger plate which is held in position by a single screw.

What I claim is:—

1. In a firearm, a receiver, a barrel having a depending lug, a fore stock adjustable forwardly and rearwardly relatively to the receiver and the barrel and having a slot for receiving the barrel lug and means for engaging the front end of the receiver, and means for adjusting the fore stock forwardly and rearwardly relatively to the receiver and the barrel, the adjusting means comprising a screw extending forwardly through the rear end of the fore stock and shouldering against the rear face of the barrel lug, substantially as and for the purpose specified.

2. In a firearm, a receiver, a barrel having a depending lug, a fore stock adjustable forwardly and rearwardly relatively to the receiver and the barrel and having a slot for receiving the barrel lug and means for engaging the front end of the receiver, and means for adjusting the fore stock forwardly and rearwardly relatively to the receiver and the barrel, said adjusting means comprising a screw extending forwardly through the rear end of the fore stock and coacting with the barrel lug, substantially as and for the purpose set forth.

3. In a firearm, a receiver, a barrel having a depending lug, a fore stock having a slot for receiving the lug, the fore stock being adjustable forwardly and rearwardly relatively to the receiver and having a slot for receiving the barrel lug, a screw extending through the rear end of the fore stock and shouldering against the rear face of the barrel lug, and a screw extending vertically through the fore stock and threading into the barrel lug, substantially as and for the purpose set forth.

4. In a firearm, a receiver, a barrel having a depending lug, a fore stock adjustable forwardly and rearwardly relatively to the receiver and barrel and having a slot for receiving the barrel lug and a cap for engaging the front end of the receiver, and means for adjusting the fore stock forwardly and rearwardly relatively to the receiver and barrel, the adjusting means comprising a screw threading into the cap and shouldering against the rear face of the barrel lug, substantially as and for the purpose described.

5. In a firearm, a receiver, a barrel having a depending lug, a fore stock adjustable forwardly and rearwardly relatively to the receiver and barrel and having a slot for receiving a depending lug and a cap for engaging the front end of the receiver, a screw passing through the cap and threading into the fore stock for securing the cap to the fore stock, and an adjusting screw threading into the cap and shouldering against the rear face of the barrel lug, the portion of the adjusting screw passing through the fore stock being unprovided with threads, substantially as and for the purpose specified.

6. In a firearm, a receiver, a barrel having a depending lug, a fore stock adjustable forwardly and rearwardly relatively to the receiver and barrel and having a slot for receiving the barrel lug, and a cap for engaging the front end of the receiver, the fore stock and the cap being connected by a mortise and tenon, a screw passing through the cap and threading into the fore stock for securing the cap to the fore stock, and an adjusting screw threading into the cap and shouldering against the rear face of the barrel lug, substantially as and for the purpose described.

7. In a firearm, a receiver, a barrel having a depending lug, a fore stock adjustable forwardly and rearwardly relatively to the receiver and barrel and having a slot for receiving the lug, and a cap for engaging the front end of the receiver, a screw passing through the cap and threading into the fore stock for securing the cap to the fore stock, an adjusting screw threading horizontally into the cap and shouldering against the rear face of the barrel lug, and a screw extending vertically through the fore stock and threading into the barrel lug, substantially as and for the purpose specified.

8. In a firearm, a receiver having a block at its front end, the block being formed with a lengthwise passage a barrel carried by the receiver, the barrel being movable about an axis into and out of its normal position, a fore stock carried by the barrel and having a cap formed with a socket, a sliding spring-pressed locking bolt in the passage of the receiver, the bolt being movable into and out of the socket of the fore stock cap, and a finger piece located on the outside of the receiver and having a stem connected to the locking bolt, substantially as and for the purpose set forth.

9. In an automatic firearm, a receiver, a reciprocating breach bolt in the receiver, a firing pin carried by the breach bolt and formed with a shoulder, a buffer spring in front of said shoulder, and a spring for returning the breach bolt to its normal or closed position, the latter spring encircling the firing pin and pressing against the opposite side of the shoulder, substantially as and for the purpose set forth.

10. In a firearm, a trigger plate, a trigger having a portion overhanging the trigger plate and formed with a downwardly-extending shoulder, a safety device extending under the overhanging portion of the trigger and movable into or out of engagement with the shoulder in order to prevent movement of the trigger, and a trigger spring interposed between the overhanging portion of the trigger and the separated portions of the trigger and safety device, substantially as and for the purpose set forth.

11. In a firearm, a trigger plate, a trigger pivoted to the plate and having a forwardly-extending arm, and a safety device pivoted by a vertical pivot to the trigger plate and extending rearwardly under said arm, the arm and the safety device having surfaces spaced apart and other surfaces for engaging each other, and the safety device being movable laterally on its pivot for carrying the latter surfaces into and out of engagement with each other in order to prevent or permit the operation of the trigger, substantially as and for the purpose described.

12. In a firearm, a trigger plate, a trigger pivoted to the plate and having a forwardly-extending arm, a safety device pivoted by a vertical pivot to the trigger plate and extending rearwardly under said arm, the arm and the safety device having surfaces spaced apart and other surfaces for engaging each other, and the safety device being movable laterally on its pivot for moving the latter surfaces into or out of engagement with each other in order to prevent or permit movement of the trigger, and a trigger spring interposed between the separated surfaces of the arm and the safety device, substantially as and for the purpose specified.

13. In a firearm, a trigger plate, a trigger, a safety device formed with a socket, a plunger movable in the socket and engaging the trigger, and a trigger spring in the socket and acting on the plunger, substantially as and for the purpose set forth.

14. In a firearm, a trigger plate, a trigger, a safety device carried by the trigger plate and formed with a socket member extending through the trigger plate and serving as a finger piece, and a trigger spring in the socket member, substantially as and for the purpose described.

15. In a firearm, a trigger plate, a trigger, a safety device carried by the trigger plate and formed with a socket member extending through the trigger plate and serving as a finger piece, a plunger movable in the socket and engaging the trigger, and a trigger spring in the socket member and acting on the plunger, substantially as and for the purpose specified.

16. In a firearm, a trigger plate, a trigger having a portion overhanging the trigger plate, a safety device on the trigger plate and extending under the overhanging portion of the trigger, said portion and the safety device having surfaces spaced apart and other surfaces for engaging each other, the safety device being movable laterally for carrying the latter surfaces into or out of engagement, and the safety device being also formed with a socket member extending through the trigger plate and serving as a finger piece, a plunger movable in the socket member and engaging the under face of the overhanging portion of the trigger, and a trigger spring in the socket member and acting on the plunger, substantially as and for the purpose set forth.

17. In an automatic firearm, a hammer, a trigger for holding the hammer cocked and for releasing the hammer, and means operable alternately with the trigger for holding the hammer cocked in order to prevent repeated firing on one pull of the trigger, said means being movable with the trigger and including a spring engaging the trigger in order to permit said means to yield relatively to the trigger, substantially as and for the purpose specified.

18. In an automatic firearm, a hammer formed with two ratchet teeth, a pivoted trigger having an arm for engaging one of the ratchet teeth for holding the hammer cocked, a safety sear mounted on the pivot of the trigger and having a part engaging with the trigger in order to partake of the movement of the trigger in one direction, the safety sear coacting with the other ratchet tooth of the hammer and being movable into operative position when the trigger is pulled, and a spring interposed between the safety sear and the trigger, substantially as and for the purpose specified.

19. In an automatic firearm, a hammer formed with two ratchet teeth, a pivoted trigger having an arm for engaging one of the ratchet teeth for holding the hammer cocked, a safety sear mounted on the pivot of the trigger and having a part engaging the trigger in order to partake of the movement of the trigger in one direction, the safety sear coacting with the other tooth of the hammer and being movable into operative position when the trigger is pulled and a spring acting on the safety sear, substantially as and for the purpose specified.

20. In an automatic firearm, a hammer having a bifurcated end, a pivoted trigger and means associated with the trigger for coöperating respectively with the bifurcations of the hammer, one of said means operating to normally hold the hammer cocked and the other means operating alternately with the former means in order to prevent repeated firing on one pull of the trigger, the latter means being mounted on the pivot of the trigger, substantially as and for the purpose set forth.

21. In an automatic firearm, a sliding breech bolt having a cam, a magazine for feeding the cartridges to the firing chamber, and a stop pivoted intermediate of its ends for holding the cartridge from movement in the magazine after a cartridge has been delivered from the magazine and the breech has been opened by the breech bolt, the stop having means in front and in rear of its pivot for coöperating with the cam, substantially as and for the purpose set forth.

22. In an automatic firearm, a firing chamber, a sliding breech bolt formed with a cam surface, a carrier for transferring the cartridges from the magazine to the firing chamber, and a stop pivoted intermediate of its ends for holding the cartridges from movement in the magazine after the cartridge has been delivered to the carrier, and during the movement of the carrier, the stop having means in front and in rear of its pivot for coacting respectively with the cam on the breech bolt, substantially as and for the purpose described.

23. In an automatic firearm, a firing chamber, a magazine, a pivoted carrier for transferring the cartridges from the magazine to the firing chamber, and a pivoted stop for holding the cartridges from movement in the magazine after the cartridge has been delivered to the carrier, the stop being mounted on the pivot of the cartridge carrier, substantially as and for the purpose specified.

24. In an automatic firearm, a firing chamber, a sliding breech bolt having cam surfaces on opposite sides thereof, a magazine, a carrier for transferring cartridges from the magazine to the firing chamber, and a movable stop for holding the cartridges from movement after a cartridge has been delivered to the carrier, the cartridge carrier having means for coacting with the cam on one side of the breech bolt, and the stop having means for coacting with the cam on the opposite side of the breech bolt, substantially as and for the purpose set forth.

25. In an automatic firearm, a firing chamber, a sliding breech bolt, having cams on opposite sides thereof, a carrier for transferring the cartridges from the magazine to the firing chamber, the carrier being pivoted intermediate of its ends and having a cartridge support at its front end and means at one end for engaging the cam on one side of the breech bolt and a pivoted stop for holding the cartridges from movement in the magazine after the cartridge has been delivered to the carrier, the stop being mounted on the pivot of the carrier and having means in front of and in rear of its pivot for coöperating with the cam on the opposite side of the breech bolt, substantially as and for the purpose described.

26. In an automatic firearm, a firing chamber, a magazine, a sliding breech bolt having cams on opposite sides thereof, a carrier for transferring cartridges from the magazine to the firing chamber, the carrier being pivoted intermediate of its ends and the major portion thereof being located at one side of the vertical plane of the breech bolt and the carrier having a cartridge support normally located beneath the breech bolt and movable in front of the breech bolt when the breech is open, the support having a cam for engaging the front end of the breech bolt, said carrier also having an arm coacting with the cam on one side of the breech bolt, and a movable stop for holding the cartridge from movement in the magazine after a cartridge has been delivered to the carrier, the stop being mounted on the pivot of the carrier and located on the opposite side of the vertical plane of the breech bolt and having arms located in front and in rear of its pivot for coacting with cams on the opposite side of the breech bolt, substantially as and for the purpose specified.

27. In an automatic firearm, a receiver, a barrel supported by the receiver and having a firing chamber, a sliding breech bolt movable lengthwise of the receiver, a magazine extending lengthwise of the receiver beneath the sliding bolt, a carrier for transferring cartridges from the magazine to the firing chamber, the carrier being located on one side of the magazine and having a cartridge support movable in front of the front end of said magazine, and a movable stop located on the other side of the magazine and having means movable into the magazine into the path of the cartridges therein for holding the cartridges from movement in the magazine after a cartridge has been delivered to the carrier and during the transferring of the cartridge to the firing chamber, substantially as and for the purpose set forth.

28. In a firearm, a stock formed with a lengthwise passage opening through its butt and with a slot extending forwardly from the rear face of the butt and opening through a side wall of the passage, a magazine slidable into and out of the passage by an endwise movement, and a locking bolt movable in the slot and transversely through the magazine and into the stock, substantially as and for the purpose specified.

29. In a firearm, a stock formed with a passage opening through its end and with a slot extending inwardly from said end and opening through a side wall of the passage, a magazine tube in the passage, a plug closing the outer end of the tube, and a locking bolt extending through the slot and transversely through the plug and into the stock, substantially as and for the purpose set forth.

30. In a firearm, a stock formed with a passage opening through its end and with a slot extending inwardly from said end and opening through a side wall of the passage, a magazine tube in the passage, a plug closing the outer end of the tube, the plug being formed with a transverse passage and with a lengthwise passage opening through the inner end of the plug and also opening into the transverse passage, a locking bolt carried by the magazine tube and extending through the slot and through the transverse passage of the plug and into the stock, the bolt being formed with sockets spaced apart in the direction of its length, a key arranged in the lengthwise passage of the plug, and a magazine spring in the tube pressing on the end of the key, substantially as and for the purpose described.

31. In a firearm, a stock formed with a passage opening through its end and with a slot extending inwardly from said end and opening through a side wall of the passage, the stock being formed with a recess near the outer end of the passage, a magazine tube in the passage and slidable into and out of the passage by an endwise movement, and a locking bolt carried by the magazine tube and extending through the slot, transversely through the magazine and into the stock, the end of the bolt projecting into said recess, substantially as and for the purpose specified.

32. In an automatic firearm, a receiver comprising side plates, a removable trigger plate comprising upright sides telescoping with the side plates of the receiver, a sliding breech bolt movable along the upper edges of the sides of the trigger plate, a hammer, a trigger and a cartridge carrier supported by the sides of the trigger plate, substantially as and for the purpose set forth.

33. In an automatic firearm, a receiver formed with a depending lug having a slot opening through its lower end, a trigger plate having sides telescoping with the sides of the receiver, a sliding breech bolt movable along the upper edges of the sides of the trigger plate and engaging the top of the receiver in order to be guided thereby, a firing pin carried by the breech bolt and extending into the slot of said lug, a hammer, a trigger, and a cartridge carrier carried by the side plates of the trigger plate, substantially as and for the purpose described.

34. In an automatic firearm, a receiver formed with a depending lug having a slot, a trigger plate, a sliding breech bolt movable in the receiver and having a shoulder located in front of the lug for engaging the lug and limiting the rearward movement of the breech bolt, a firing pin carried by the breech bolt and extending into the slot of said lug, and a spring coiled around the firing pin, the spring shouldering against the lug and the breech bolt, substantially as and for the purpose specified.

35. In an automatic firearm, a receiver formed with a depending lug having a slot opening through its lower end, a trigger plate having sides telescoping with the sides of the receiver, a sliding breech bolt movable along the upper edges of the sides of the trigger plate and having a shoulder located in front of the lug and limiting the rearward movement of the breech bolt, a firing pin carried by the breech bolt and extending into the slot of said lug, a spring coiled around the firing pin the spring shouldering against the lug and the breech bolt, a hammer, a trigger, and a cartridge carrier carried by the side plates of the trigger plate, substantially as and for the purpose set forth.

36. In an automatic firearm, a frame, a magazine extending lengthwise of the frame, a hammer, and a trigger having portions extending on opposite sides of the magazine, and cartridge transferring means having portions extending on opposite sides of the magazine, substantially as and for the purpose specified.

37. In an automatic firearm, a frame, a magazine extending lengthwise of the frame, a hammer and a trigger having portions extending on opposite sides of the magazine, and cartridge transferring means having portions extending on opposite sides of the magazine, the transferring means also having a cartridge support extending in front of the end of the magazine, substantially as and for the purpose set forth.

38. In an automatic firearm, a receiver including side plates, a trigger plate having upright sides telescoping with the side plates of the receiver, the trigger plate also having a block at its rear end formed with a passage, a breech bolt slidable along the upper edges of the sides of the trigger plate, a magazine, extending lengthwise of the stock through the passage of the trigger plate block, a hammer carried by the sides of the trigger plate and having bifurcations extending to opposite sides of the magazine, a trigger having means associated therewith for coacting with the bifurcations of the hammer, and cartridge transferring means carried by the sides of the trigger plate and extending to opposite sides of the magazine, substantially as and for the purpose described.

39. In an automatic firearm, a frame having parallel lengthwise passages at its rear end and located near the upper and lower sides of said frame, a stock having parallel lengthwise passages alined respectively with the passages of the frame, means connecting the frame and the stock including tubes arranged in the alined passages, one tube serving as the magazine, and firing mechanism including a spring arranged in the other tube, substantially as and for the purpose set forth.

40. In an automatic firearm, a receiver having side plates and a rearwardly-extending tang provided with a depending lug formed with a lengthwise passage, the receiver also having a block at its front end, a trigger plate having sides telescoping with the side plates of the receiver and a block at its rear end arranged between the sides of the receiver, the block of the trigger plate being formed with a lengthwise passage, the front end of the trigger plate being connected to the block of the receiver by a mortise and tenon, a fastening member extending transversely through the receiver and the block of the trigger plate, a stock formed with passages alined, respectively, with the passage of the said lug and the passage of the block of the trigger plate, means connecting the receiver and the stock, and the trigger plate and the stock arranged, respectively, in the alined openings, substantially as and for the purpose described.

41. In an automatic firearm, a receiver having a shell exit slot, a sliding breech bolt in the receiver in engagement with the wall of the receiver provided with the slot, a cover having a portion movable in the exit slot and having its inner face flush with the inner face of the receiver wall in which said slot is formed, the breech bolt and cover having opposing faces in contact, and one of the parts having such contacting opposing faces formed with a recess opening through the face thereof opposed to the other of said parts, means for detachably securing the cover and breach bolt together, and an extractor arranged in the groove and held in position by the cover, substantially as and for the purpose set forth.

42. In an automatic firearm, a receiver having a shell exit slot, a sliding breech bolt in the receiver and engaging the wall of the receiver provided with the slot, a cover for the slot and movable in the slot, means connecting the cover to the breech bolt, such means extending from the outside of the receiver through the cover and slot and into the breech bolt, and an extractor movable with the breech bolt and located between the cover and the breech bolt and being held in position by the cover, substantially as and for the purpose specified.

43. In an automatic firearm, a receiver having a shell exit slot, a sliding breech bolt having a groove opening through its front face and through a side face thereof, a recess at the rear end of the groove, the recess also opening through the side face of the breech bolt and a socket extending rearwardly from the recess, a cover for the exit slot movable with the breech bolt, and an extractor having a shank arranged in the groove, a collar in the recess and a stem in the socket, a spring in the socket around the stem and permitting lateral movement of the extractor, the extractor being held in position by the cover, substantially as and for the purpose specified.

44. In an automatic firearm, a receiver having a shell exit slot, a sliding breech bolt in the receiver and engaging the receiver wall provided with the slot, the breech bolt having a groove in the side thereof engaging the wall formed with the slot, the groove opening through the front end of the breech bolt, a cover movable in the exit slot, means extending transversely through the cover and into the breech bolt through the slot for securing the cover to the breech bolt, and an extractor arranged in the groove and being held therein by the cover, substantially as and for the purpose set forth.

45. In a firearm, a trigger plate, a pivoted trigger having a projecting arm, a device supported by said trigger plate against movement in the direction of movement of the trigger and movable in a direction at an angle to the direction of movement of the trigger, a spring carried by said device and coöperating with said arm, said spring tending to hold the trigger in its initial position, and coöperating surfaces on the arm and device for preventing movement of the trigger, said surfaces being brought into and out of coöperative relation by shifting said device.

In testimony whereof, I have hereunto signed my name in the presence of two attesting witnesses, at Ilion, in the county of Herkimer, in the State of New York, this 27th day of March, 1909.

CHARLES H. BARNES.

Witnesses:
ALFRED BROWN,
CHARLES H. BROWN.